(12) United States Patent
Tailang

(10) Patent No.: US 10,853,983 B2
(45) Date of Patent: Dec. 1, 2020

(54) SUGGESTIONS TO ENRICH DIGITAL ARTWORK

(71) Applicant: Adobe Inc., San Jose, CA (US)

(72) Inventor: Nikhil Tailang, Maharashtra (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/390,876

(22) Filed: Apr. 22, 2019

(65) Prior Publication Data

US 2020/0334878 A1  Oct. 22, 2020

(51) Int. Cl.
*G06T 11/60* (2006.01)
*G06T 13/80* (2011.01)
*G06F 16/583* (2019.01)

(52) U.S. Cl.
CPC .......... *G06T 11/60* (2013.01); *G06F 16/5838* (2019.01); *G06F 16/5854* (2019.01); *G06T 13/80* (2013.01)

(58) Field of Classification Search
None
See application file for complete search history.

(56) References Cited

U.S. PATENT DOCUMENTS

| | | | |
|---|---|---|---|
| 5,696,964 A | 12/1997 | Cox et al. |
| 6,012,073 A | 1/2000 | Arend et al. |
| 6,157,435 A | 12/2000 | Slater et al. |
| 6,483,570 B1 | 11/2002 | Slater |
| 6,574,616 B1 | 6/2003 | Saghir |
| 6,629,104 B1 | 9/2003 | Parulski et al. |
| 6,859,802 B1 | 2/2005 | Rui |
| 6,873,327 B1 | 3/2005 | Edwards et al. |
| 6,901,378 B1 | 5/2005 | Linker et al. |
| 6,941,294 B2 | 9/2005 | Flank |
| 7,047,413 B2 | 5/2006 | Yacobi et al. |
| 7,113,921 B2 | 9/2006 | Linker |
| 7,127,106 B1 | 10/2006 | Neil et al. |
| 7,249,034 B2 | 7/2007 | Schirmer |
| 7,286,723 B2 | 10/2007 | Taugher et al. |
| 7,460,737 B2 | 12/2008 | Shuster |
| 7,492,921 B2 | 2/2009 | Foote et al. |
| 7,493,340 B2 | 2/2009 | Rui |
| 7,523,102 B2 | 4/2009 | Bjarnestam et al. |
| 7,574,378 B2 | 8/2009 | Lipowitz et al. |
| 7,613,686 B2 | 11/2009 | Rui |
| 7,689,620 B2 | 3/2010 | Tan |

(Continued)

OTHER PUBLICATIONS

Author: Savva et al.; Title: SceneSuggest: Context-driven 3D Scene Design; Date: Feb. 2017; Source: https://arxiv.org/pdf/1703.00061.pdf (Year: 2017).*

(Continued)

*Primary Examiner* — Jwalant Amin
(74) *Attorney, Agent, or Firm* — SBMC

(57) ABSTRACT

In implementations of suggestions to enrich digital artwork, a suggestion system identifies a first object in the digital artwork and suggests a second object for addition to the digital artwork based on the second object having a co-occurrence relationship with the first object. The co-occurrence relationship is based on the first object and the second object appearing together in an image of an image set. A user may select the second object to add to the artwork or the user may be inspired by the second object to enrich the digital artwork.

20 Claims, 9 Drawing Sheets

(56) References Cited

U.S. PATENT DOCUMENTS

| | | | |
|---|---|---|---|
| 7,725,398 B2 | 5/2010 | Dawson et al. | |
| 7,783,624 B2 | 8/2010 | Martinez et al. | |
| 7,797,377 B2 | 9/2010 | Linker et al. | |
| 7,808,555 B2 | 10/2010 | Aratani et al. | |
| 7,818,261 B2 | 10/2010 | Weiskopf et al. | |
| 7,920,760 B2 | 4/2011 | Yoda | |
| 7,929,810 B2 | 4/2011 | Shuster | |
| 7,933,765 B2 | 4/2011 | Summerlin et al. | |
| 7,940,959 B2 | 5/2011 | Rubenstein | |
| 7,949,625 B2 | 5/2011 | Brough et al. | |
| 7,961,938 B1 | 6/2011 | Remedios | |
| 7,996,266 B2 | 8/2011 | Gura | |
| 8,041,612 B1 | 10/2011 | Treyz | |
| 8,073,828 B2 | 12/2011 | Bowden et al. | |
| 8,144,995 B2 | 3/2012 | Thompson | |
| 8,155,382 B2 | 4/2012 | Rubenstein | |
| 8,219,494 B1 | 7/2012 | Pride et al. | |
| 8,229,800 B2 | 7/2012 | Trotman et al. | |
| 8,285,082 B2 | 10/2012 | Heck | |
| 8,285,084 B2 | 10/2012 | Yoda | |
| 8,341,195 B1 | 12/2012 | Cole et al. | |
| 8,380,005 B1 | 2/2013 | Jonsson | |
| 8,396,331 B2 | 3/2013 | Jia et al. | |
| 8,412,568 B2 | 4/2013 | Bastos et al. | |
| 8,413,182 B2 * | 4/2013 | Bill | G06Q 30/02 725/34 |
| 8,417,000 B1 | 4/2013 | Mendis | |
| 8,452,049 B2 | 5/2013 | Rubenstein | |
| 8,504,547 B1 | 8/2013 | Yee et al. | |
| 8,515,139 B1 | 8/2013 | Nechyba et al. | |
| 8,560,455 B1 | 10/2013 | Raman et al. | |
| 8,571,329 B2 | 10/2013 | Thompson | |
| 8,582,872 B1 | 11/2013 | Loffe et al. | |
| 8,620,905 B2 | 12/2013 | Ellsworth | |
| 8,625,887 B2 | 1/2014 | Li | |
| 8,644,646 B2 | 2/2014 | Heck | |
| 8,688,586 B2 | 4/2014 | Pride et al. | |
| 8,699,826 B2 | 4/2014 | Remedios | |
| 8,745,086 B2 | 6/2014 | Cardno et al. | |
| 8,774,529 B2 | 7/2014 | Rubenstein et al. | |
| 8,792,685 B2 | 7/2014 | Sangster | |
| 8,812,392 B2 | 8/2014 | Shahghasemi | |
| 8,831,998 B1 | 9/2014 | Cramer et al. | |
| 8,879,837 B2 | 11/2014 | Usher | |
| 8,898,171 B2 | 11/2014 | Tan | |
| 8,934,717 B2 | 1/2015 | Newell et al. | |
| 8,959,003 B2 | 2/2015 | Brugler et al. | |
| 9,071,662 B2 | 6/2015 | Svendsen et al. | |
| 9,255,807 B2 | 2/2016 | Lee et al. | |
| 9,489,400 B1 | 11/2016 | Haitani | |
| 9,571,726 B2 | 2/2017 | Horowitz | |
| 9,576,046 B2 | 2/2017 | Bullotta et al. | |
| 9,639,634 B1 * | 5/2017 | Greene | H04N 21/4668 |
| 9,715,714 B2 | 7/2017 | Koch et al. | |
| 9,824,463 B2 | 11/2017 | Ingrassia et al. | |
| 9,858,244 B1 | 1/2018 | Bjorkegren | |
| 9,911,172 B2 | 3/2018 | Koch et al. | |
| 10,234,290 B2 | 3/2019 | Lush et al. | |
| 10,366,433 B2 | 7/2019 | Koch et al. | |
| 10,453,226 B1 | 10/2019 | Burrows et al. | |
| 10,475,098 B2 | 11/2019 | Koch et al. | |
| 10,592,548 B2 | 3/2020 | Koch et al. | |
| 2002/0033844 A1 | 3/2002 | Levy et al. | |
| 2003/0151611 A1 | 8/2003 | Turpin et al. | |
| 2004/0202349 A1 | 10/2004 | Erol et al. | |
| 2005/0010553 A1 | 1/2005 | Liu | |
| 2006/0184572 A1 * | 8/2006 | Meek | G06F 16/2462 |
| 2006/0204142 A1 | 9/2006 | West et al. | |
| 2007/0097959 A1 | 5/2007 | Taylor | |
| 2007/0133947 A1 | 6/2007 | Armitage et al. | |
| 2007/0168513 A1 | 7/2007 | Weiskopf et al. | |
| 2007/0208670 A1 | 9/2007 | Quoc | |
| 2007/0297683 A1 | 12/2007 | Luo et al. | |
| 2008/0144883 A1 | 6/2008 | Kacker et al. | |
| 2009/0083236 A1 | 3/2009 | Shuster | |
| 2009/0160859 A1 | 6/2009 | Horowitz | |
| 2009/0276453 A1 * | 11/2009 | Trout | G06F 16/435 |
| 2009/0287669 A1 | 11/2009 | Bennett | |
| 2010/0070342 A1 | 3/2010 | Hu et al. | |
| 2010/0306344 A1 | 12/2010 | Athas et al. | |
| 2011/0029408 A1 | 2/2011 | Shusterman et al. | |
| 2011/0167059 A1 | 7/2011 | Fallah | |
| 2011/0270697 A1 | 11/2011 | Sunkada | |
| 2012/0094639 A1 | 4/2012 | Carlson et al. | |
| 2012/0120097 A1 | 5/2012 | Sun et al. | |
| 2012/0128239 A1 | 5/2012 | Goswami et al. | |
| 2012/0179673 A1 | 7/2012 | Kelly et al. | |
| 2012/0226651 A1 * | 9/2012 | Chidlovskii | G06Q 10/10 706/52 |
| 2013/0019257 A1 | 1/2013 | Tschernutter et al. | |
| 2013/0024293 A1 * | 1/2013 | Tinsman | G06Q 30/0275 705/14.68 |
| 2013/0080881 A1 | 3/2013 | Goodspeed et al. | |
| 2013/0117258 A1 | 5/2013 | Linsley et al. | |
| 2013/0132886 A1 | 5/2013 | Mangini et al. | |
| 2013/0167105 A1 | 6/2013 | Goldman et al. | |
| 2013/0215116 A1 | 8/2013 | Siddique et al. | |
| 2013/0335582 A1 | 12/2013 | Itasaki et al. | |
| 2014/0019264 A1 | 1/2014 | Wachman et al. | |
| 2014/0046792 A1 | 2/2014 | Ganesan | |
| 2014/0114962 A1 | 4/2014 | Rosenburg et al. | |
| 2014/0122283 A1 | 5/2014 | Mehra et al. | |
| 2014/0149376 A1 * | 5/2014 | Kutaragi | G06K 9/4676 707/706 |
| 2014/0189525 A1 | 7/2014 | Trevisiol et al. | |
| 2014/0201227 A1 | 7/2014 | Hamilton-Dick et al. | |
| 2014/0245358 A1 | 8/2014 | Kumar et al. | |
| 2014/0289134 A1 | 9/2014 | Sutton | |
| 2014/0310264 A1 | 10/2014 | D'Ambrosio | |
| 2014/0324838 A1 | 10/2014 | Sako et al. | |
| 2014/0351021 A1 | 11/2014 | Higbie | |
| 2014/0351284 A1 | 11/2014 | Ikonomov | |
| 2014/0365463 A1 | 12/2014 | Tusk | |
| 2015/0018094 A1 | 1/2015 | Watari et al. | |
| 2015/0106628 A1 | 4/2015 | Holman et al. | |
| 2015/0161258 A1 | 6/2015 | Yee et al. | |
| 2015/0234864 A1 | 8/2015 | Kruckemeier | |
| 2015/0324394 A1 | 11/2015 | Becker et al. | |
| 2015/0347369 A1 | 12/2015 | Babon et al. | |
| 2015/0363503 A1 | 12/2015 | Scheuerman | |
| 2016/0035055 A1 | 2/2016 | Perkins et al. | |
| 2016/0180193 A1 | 6/2016 | Masters | |
| 2016/0196589 A1 | 7/2016 | Subbarayan | |
| 2016/0226984 A1 | 8/2016 | Kelly et al. | |
| 2016/0253707 A1 | 9/2016 | Momin et al. | |
| 2016/0314203 A1 | 10/2016 | Wickenkamp | |
| 2016/0370973 A1 | 12/2016 | Morgan et al. | |
| 2017/0034286 A1 | 2/2017 | Kirschner | |
| 2017/0052981 A1 | 2/2017 | Koch et al. | |
| 2017/0053103 A1 | 2/2017 | Koch et al. | |
| 2017/0053104 A1 | 2/2017 | Koch et al. | |
| 2017/0053189 A1 | 2/2017 | Koch et al. | |
| 2017/0053332 A1 | 2/2017 | Koch et al. | |
| 2017/0053365 A1 | 2/2017 | Koch et al. | |
| 2017/0053372 A1 | 2/2017 | Koch et al. | |
| 2017/0221171 A1 | 8/2017 | Koch et al. | |
| 2017/0300750 A1 * | 10/2017 | Jonsson | G06K 9/628 |
| 2019/0065856 A1 * | 2/2019 | Harris | G06K 9/6257 |
| 2020/0065875 A1 | 2/2020 | Koch et al. | |
| 2020/0097764 A1 * | 3/2020 | de Juan | G06F 16/5838 |

OTHER PUBLICATIONS

Author: Rui Ma; Title: Analysis and Modeling of 3D Indoor Scenes; Date: Jun. 2017; source: https://arxiv.org/pdf/1706.09577.pdf (Year: 2017).*

Author: Zhang et al.; Title: What and Where: A Context-based Recommendation System for Object Insertion; Date: Nov. 20181; Source: https://arxiv.org/pdf/1811.09783.pdf (Year: 2018).*

Author: Lee et al.; Title: Context-Aware Synthesis and Placement of Object Instances; Date: Dec. 2018; Source: https://papers.nips.cc/paper/8240-context-aware-synthesis-and-placement-of-object-instances.pdf (Year: 2018).*

(56) References Cited

OTHER PUBLICATIONS

Author: Ma et al.; Title: Action-Driven 3D Indoor Scene Evolution; Date: Dec. 2016; Source: https://dl.acm.org/doi/10.1145/2980179.2980223 (Year: 2016).*
Author: Yu et al.; Title: The Clutterpalette: An Interactive Tool for Detailing Indoor Scenes; Date: 2015; Source: http://www.saikit.org/projects/clutterPalette/clutterpalette.pdf (Year: 2015).*
Author: Fisher et al.; Title: Context-Based Search for 3D Models; Date: 2010; Source: https://www.researchgate.net/profile/Matthew_Fisher8/publication/220183415_Context-Based_Search_for_3D_Models/links/544ea3230cf26dda0890184b/Context-Based-Search-for-3D-Models.pdf?origin=publication_detail (Year: 2010).*
Author: Wang et al.; Title: Deep Convolutional Priors for Indoor Scene Synthesis; Date: Aug. 2018; Source: https://dritchie.github.io/pdf/deepsynth.pdf (Year: 2018).*
Author: Fisher et al.; Title: Characterizing Structural Relationships in Scenes Using Graph Kernels; Date: Jul. 2011; Source: https://dl.acm.org/doi/10.1145/1964921.1964929 (Year: 2011).*
"Corrected Notice of Allowability", U.S. Appl. No. 14/828,085, dated Jan. 2, 2020, 3 pages.
"Final Office Action", U.S. Appl. No. 14/827,600, dated Jan. 24, 2020, 13 pages.
"Notice of Allowance", U.S. Appl. No. 14/828,085, dated Nov. 14, 2019, 11 pages.
"Examiner's Answer to Appeal Brief", U.S. Appl. No. 14/827,670, dated Nov. 28, 2018, 8 pages
"Final Office Action", U.S. Appl. No. 14/827,583, dated Mar. 8, 2019, 25 pages.
"Final Office Action", U.S. Appl. No. 14/827,645, dated Mar. 13, 2019, 12 pages.
"Final Office Action", U.S. Appl. No. 14/827,670, dated Feb. 1, 2018, 29 pages.
"Final Office Action", U.S. Appl. No. 14/827,836, dated Jul. 14, 2017, 24 pages.
"Final Office Action", U.S. Appl. No. 14/827,836, dated Oct. 30, 2018, 14 pages.
"Final Office Action", U.S. Appl. No. 14/828,085, dated Jul. 20, 2018, 28 pages.
"Final Office Action", U.S. Appl. No. 14/828,085, dated Dec. 12, 2017, 29 pages.
"First Action Interview Office Action", U.S. Appl. No. 14/827,600, dated Sep. 24, 2018, 3 pages.
"First Action Interview Office Action", U.S. Appl. No. 14/827,836, dated Mar. 22, 2017, 4 pages.
"First Action Interview Office Action", U.S. Appl. No. 14/827,670, dated Aug. 29, 2017, 4 pages.
"First Action Interview Office Action", U.S. Appl. No. 14/828,085, dated Aug. 24, 2017, 4 pages.
"Non-Final Office Action", U.S. Appl. No. 14/827,600, dated Apr. 22, 2019, 11 pages.
"Non-Final Office Action", U.S. Appl. No. 14/827,645, dated Oct. 29, 2018, 12 pages.
"Non-Final Office Action", U.S. Appl. No. 14/827,836, dated Apr. 4, 2018, 26 pages.
"Non-Final Office Action", U.S. Appl. No. 14/828,085, dated Mar. 26, 2018, 29 pages.
"Notice of Allowance", U.S. Appl. No. 14/827,836, dated Mar. 13, 2019, 10 pages.
"Notice of Allowance", U.S. Appl. No. 14/827,974, dated Apr. 19, 2017, 7 pages.
"Notice of Allowance", U.S. Appl. No. 15/491,943, dated Oct. 24, 2017, 6 pages.
"Pre-Interview Communication", U.S. Appl. No. 14/827,670, dated Feb. 17, 2017, 3 pages.
"Pre-Interview Communication", U.S. Appl. No. 14/827,836, dated Jan. 26, 2017, 4 pages.
"Pre-Interview Communication", U.S. Appl. No. 14/827,974, dated Mar. 1, 2017, 3 pages.
"Pre-Interview Communication", U.S. Appl. No. 14/828,085, dated Feb. 28, 2017, 4 pages.
"Pre-Interview Communication", U.S. Appl. No. 15/491,943, dated Sep. 14, 2017, 3 pages.
"Pre-Interview First Office Action", U.S. Appl. No. 14/827,583, dated Oct. 5, 2018, 5 pages.
"Pre-Interview First Office Action", U.S. Appl. No. 14/827,600, dated Aug. 10, 2018, 3 pages.
"Pre-Interview First Office Action", U.S. Appl. No. 14/827,645, dated Nov. 5, 2018, 3 pages.
"Restriction Requirement", U.S. Appl. No. 14/827,583, dated Jul. 19, 2019, 6 pages.
"Restriction Requirement", U.S. Appl. No. 14/827,645, dated Jun. 18, 2018, 6 pages.
"Supplemental Notice of Allowance", U.S. Appl. No. 15/491,943, dated Feb. 6, 2018, 2 pages.
Trevisiol,"Image Ranking Based on User Browsing Behavior", SIGIR '12 Proceedings of the 35th international ACM SIGIR conference on Research and development in information retrieval, ACM ISBN: 978-1-4503-1472-5, Aug. 16, 2012, 10 pages.
"Final Office Action", U.S. Appl. No. 14/827,600, dated Apr. 25, 2019, 10 pages.
"Notice of Allowance", U.S. Appl. No. 14/827,645, dated Jun. 26, 2019, 12 pages.
"Supplemental Notice of Allowance", U.S. Appl. No. 14/827,836, dated Jun. 21, 2019, 2 pages.
"Non-Final Office Action", U.S. Appl. No. 14/828,085, dated Jun. 12, 2019, 25 pages.
"Non-Final Office Action", U.S. Appl. No. 14/827,600, dated Sep. 4, 2019, 10 pages.
"Non-Final Office Action", U.S. Appl. No. 14/827,583, dated Jul. 29, 2019, 26 pages.
"Final Office Action", U.S. Appl. No. 14/827,583, dated Mar. 18, 2020, 28 pages.
"Advisory Action", U.S. Appl. No. 14/827,583, dated Sep. 15, 2020, 3 pages.
"Non-Final Office Action", U.S. Appl. No. 14/827,670, dated Sep. 29, 2020, 13 pages.
"Notice of Allowance", U.S. Appl. No. 14/827,600, dated Aug. 19, 2020, 8 pages.
"Patent Trial and Appeal Board Decision", U.S. Appl. No. 14/827,670, dated Jul. 2, 2020, 16 pages.

* cited by examiner

SUGGESTIONS TO ENRICH DIGITAL ARTWORK

BACKGROUND

A graphic designer is responsible for communicating messages relating to a subject through visual means such as by creating illustrations or photo compositions to convey these messages. It is common for less experienced graphic designers to focus their designs on the primary subject of a design; however, designers struggle to add secondary objects and backgrounds to their designs which could significantly enrich the designs. For example, a graphic designer may be required to communicate a message relating to a new smartphone. In this example, the designer is usually able to illustrate the smartphone without significant difficulty. But adding secondary objects to support and enrich the message can be more challenging for the designer. For example, selecting a background or accessories to include in the smartphone illustration may be difficult for the designer in this situation.

Conventional systems to overcome such a creative block include functionality to enable the graphic designer to search for images of other designs having smartphones. Thus, conventional systems rely on inputs provided by human users to identify secondary objects that frequently appear in illustrations having a primary object. These conventional systems may allow the graphic designer to identify secondary objects that frequently appear in illustrations of smartphones such as a stylus, headphones, a smartwatch, a charging accessory, a protective case, a notepad, and a cup of coffee.

Suggestions generated by the conventional systems are often either already apparent to a designer or have no relevancy to a message the designer is communicating. Additionally, conventional systems are not capable of making suggestions based on information relating to an entire set of images. In the smartphone example, the conventional systems may generate suggestions of a stylus, headphones, a smartwatch, a protective case, a giraffe, and a banana. In this example, the first four suggestions may be already apparent to the designer while the last two suggestions may have no relevancy to the message the designer is communicating.

SUMMARY

Systems and techniques are described for suggestions to enrich digital artwork. A computing device implements a suggestion system which identifies a first object and a second object in digital artwork in a user interface. The suggestion system references a co-occurrence graph to identify a third object based on a co-occurrence relationship between the third object and at least one of the first object and the second object. The co-occurrence graph includes sets of objects that are depicted together in images of an image set. The suggestion system generates a suggestion of the third object to enrich the digital artwork by rendering an indication of the third object in the user interface.

The described systems improve functionality of conventional systems by providing indications of objects as suggestions to enrich digital artwork in real time as the artwork is being created. Furthermore, the described systems are capable of suggesting additions to the digital artwork based on object co-occurrence information from an entire set of images or from multiple sets of images. This capability enables the systems to generate suggestions based on relevancy and/or creativity. Additionally, the systems can generate suggestions to animate objects or augment a static reality.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
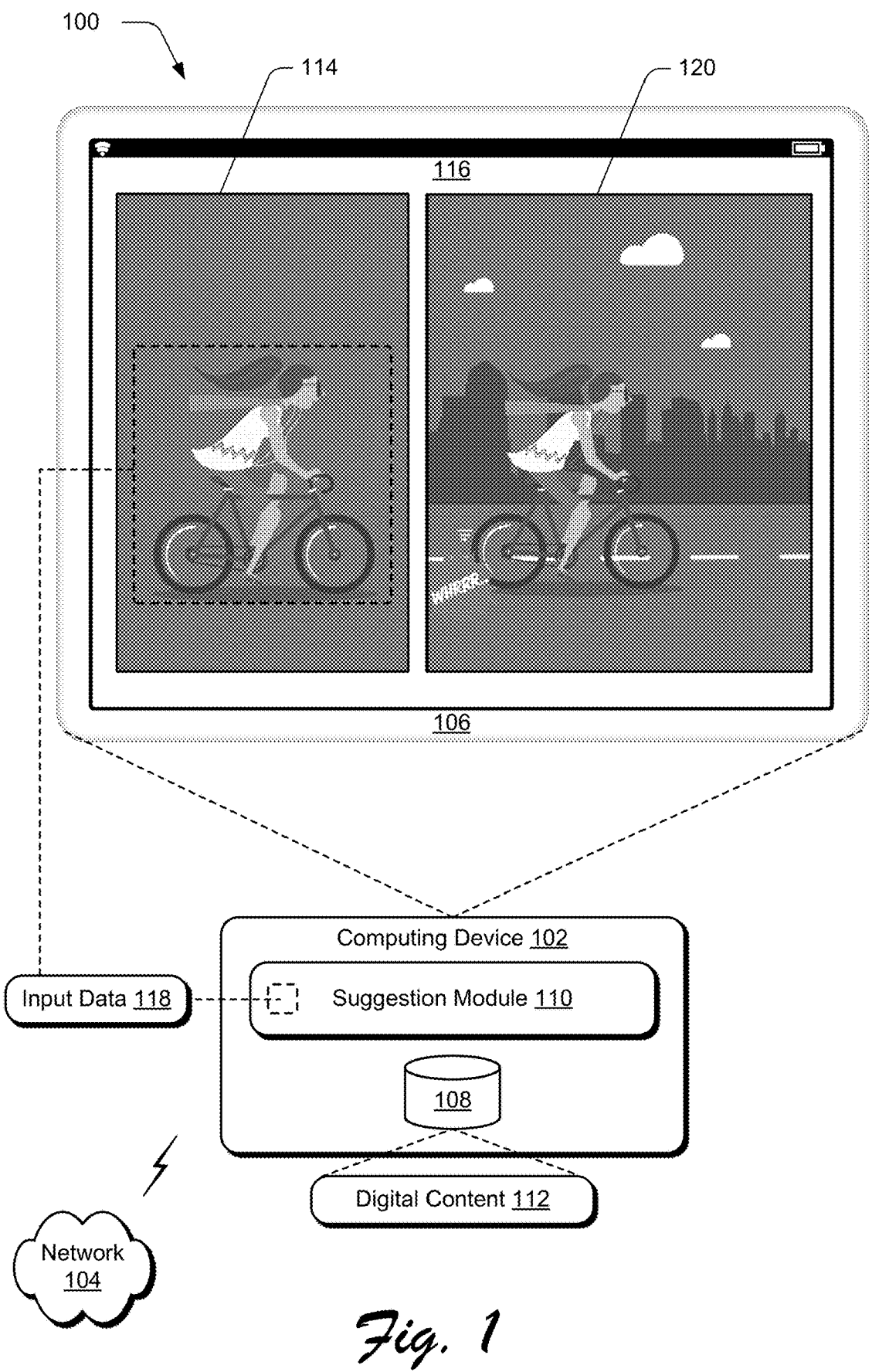
FIG. 1 is an illustration of an environment in an example implementation that is operable to employ digital systems and techniques as described herein.

Graphic designers are responsible for communicating messages relating to subjects through visual means such as by creating illustrations or photo compositions to convey these messages. It is common for inexperienced graphic designers to focus their designs on the primary subject of a design. However, designers struggle to add secondary objects and backgrounds to their designs which could significantly enrich the designs. For example, a graphic designer may be required to communicate a message relating to a new smartphone. In this example, the designer is usually able to illustrate the smartphone without significant difficulty. But adding secondary objects and context to support and enrich the message can be more challenging for the designer. For example, selecting a background or accessories for the smartphone to include in the illustration may be difficult for the designer in this situation.

Conventional systems to overcome such creative blocks include functionality to allow the graphic designer to search for images of other designs having smartphones. Thus, conventional systems rely on inputs provided by human users to identify secondary objects that frequently appear in illustrations having a primary object. These conventional systems may allow the graphic designer to identify secondary objects that frequently appear in illustrations of smartphones such as a stylus, headphones, a charging accessory, a protective case, a notepad, and a cup of coffee.

Suggestions generated by the conventional systems are often either so relevant that they are already apparent to a designer or the suggestions have no relevancy at all to a message the designer is communicating. Additionally, conventional systems are not capable of making suggestions based on information relating to an entire set of images or entire sets of images. In the smartphone example, the conventional systems may generate suggestions of a stylus, headphones, a charging accessory, a protective case, a giraffe, and a pineapple. In this example, the first four suggestions may already be apparent to the designer while the last two suggestions may have no relevancy to the message the designer is communicating.

Systems and techniques are described for suggestions to enrich digital artwork. In accordance with these techniques, a computing device implements a suggestion system which generates indications of objects as suggestions to enrich the digital artwork. The suggestion system can identify a first object and a second object in digital artwork in a user interface. The system may reference a co-occurrence graph included as part of co-occurrence data to identify a third object based on a co-occurrence relationship between the third object and at least one of the first object and the second object. The co-occurrence graph can include sets of objects that are depicted together in images of an image set. This co-occurrence graph may also include a frequency of co-occurrences of objects in the images and the system can leverage the frequency of co-occurrences to suggest objects as being highly relevant and/or highly creative as generally having higher numbers of co-occurrences and lower numbers of co-occurrences, respectively.

The suggestion system can suggest the third object to enrich the digital artwork by rendering an indication of the third object in the user interface. This indication can be in the form of text or an outline of the third object. The indication can also be selectable to add the third object to the digital artwork. For example, the indication may include several renderings of the third object and a user may select a rendering of the third object to add to the artwork such as by manipulation of an input device.

The described systems improve functionality of conventional systems by providing indications of objects as suggestions to enrich digital artwork in real time as the artwork is being created in a user interface. Furthermore, the described systems are capable of suggesting additions to the digital artwork based on object co-occurrence information from an entire set of images or from multiple sets of images. This capability can enable the systems described herein to generate suggestions based on relevancy and/or creativity which is not possible in conventional systems. Additionally, these systems may generate suggestions to animate objects or augment a static reality. The described systems can also generate suggestions for brand compliance, subliminal messaging, assistive drawing, etc.

Term Descriptions

As used herein, the term "co-occurrence graph" refers to data representative of objects determined to be depicted together in digital artwork. By way of example, a co-occurrence graph represents sets of objects determined to be depicted together in images of an image set. A set of objects has a frequency of co-occurrence based on a number of images that depict the set of objects. For example, if a particular set of objects appears in three images of the image set, then the particular set of objects has a frequency of co-occurrence of three.

As used herein, the term "co-occurrence data" refers to data describing co-occurrence relationships of objects. The co-occurrence graph is included in the co-occurrence data.

As used herein, the term "co-occurrence relationship" refers to the existence of a characteristic to enrich digital artwork. For example, a set of objects in the co-occurrence graph is usable to enrich the digital artwork by suggesting one object of the set for addition to the digital artwork based on the other object of the set being depicted in the digital artwork. However, a co-occurrence relationship can include spatial relationships between objects such as an object is a parent object of a child object and this is usable to suggest a relative orientation of the objects in the digital artwork. A co-occurrence relationship can also include other features of an object. For example, these other features may indicate that the object is commonly depicted in multiples such as if the object is a cloud.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. In one or more implementations, the display device 106 is included within a housing of the computing device 102 as illustrated, e.g., in mobile device implementations. It is to be appreciated; however, that a variety of device configurations may be used to implement the computing device 102 and/or the display device 106. The computing device 102 includes a storage device 108 and a suggestion module 110. The storage device 108 is illustrated to include digital content 112.

An example of the digital content 112 is digital artwork 114 which is displayed in a user interface 116 on the display device 106. The digital artwork 114 may be presented via a graphic design system or application. In this example, the digital artwork 114 is also illustrated as being included in input data 118. The suggestion module 110 is illustrated as having, receiving, and/or transmitting input data 118. For example, the computing device 102 may implement the suggestion module 110 to receive the input data 118 which can include the digital artwork 114, and the suggestion module 110 can process the input data 118 to suggest objects to enrich the digital artwork 114. An example of enriched digital artwork 120 is also displayed in the user interface 116. As shown in FIG. 1, the enriched digital artwork 120 includes objects suggested by the suggestion module 110 such as clouds, a road, a skyline, an object indicating directional movement, and an object indicating a sound associated with such movement.

Figure 2:
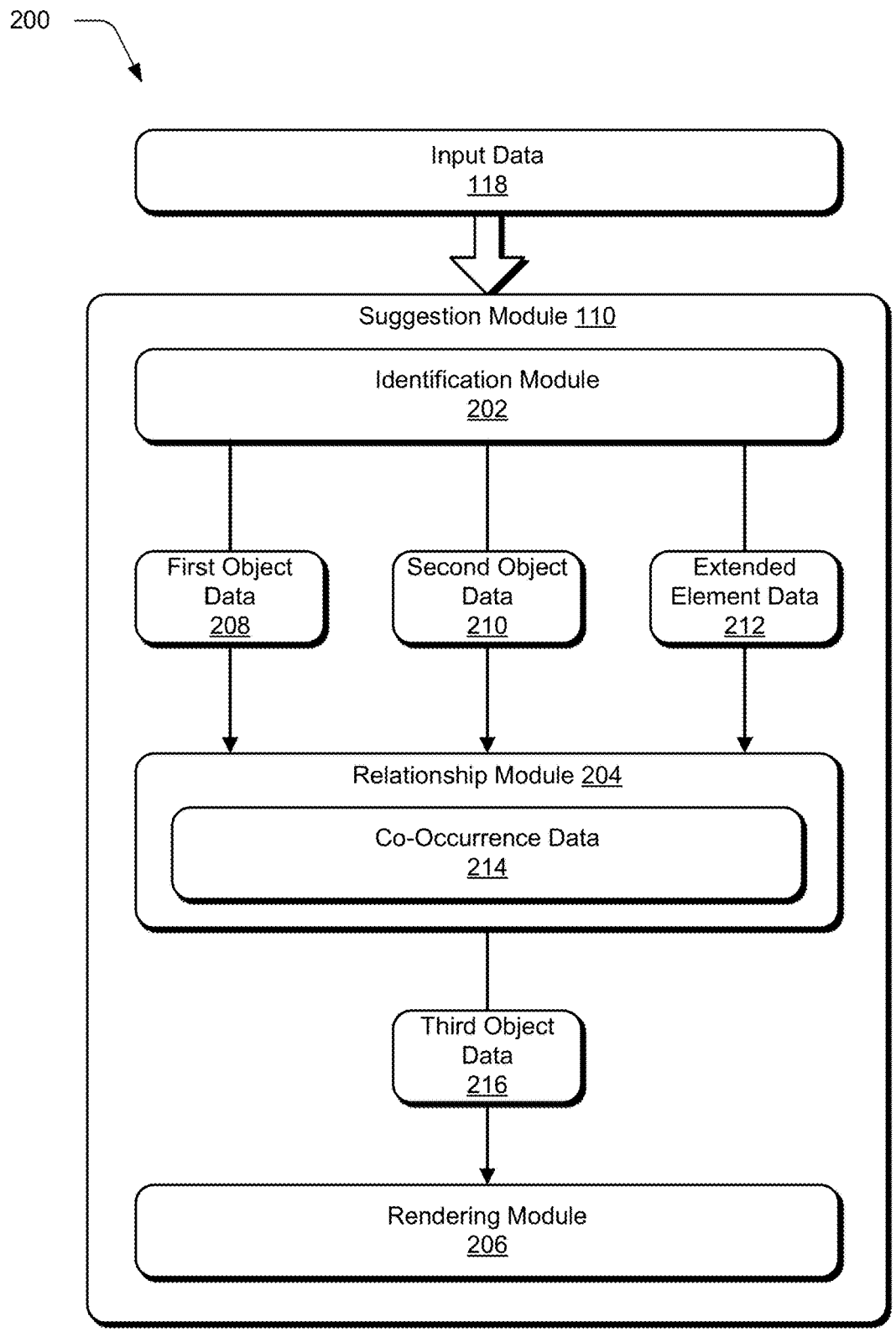
FIG. 2 depicts a system in an example implementation showing operation of a suggestion module.

FIG. 2 depicts a system 200 in an example implementation showing operation of a suggestion module 110 which the computing device 102 can implement to suggest objects to enrich the digital artwork 114. The suggestion module 110 is illustrated to include an identification module 202, a relationship module 204, and a rendering module 206. As shown in FIG. 2, the suggestion module 110 may also be implemented to receive input data 118 which can include the digital artwork 114. In one example, the suggestion module 110 may receive the input data 118 directly such as in response to a user input in the user interface 116. In another example, the suggestion module 110 may receive the input data 118 indirectly such as over the network 104.

In some examples, the suggestion module 110 may be implemented as part of a service or a service module to receive input data 118 including the digital artwork 114 and the suggestion module 110 may output suggestions to enrich the digital artwork. For example, the suggestion module 110 may receive the digital artwork 114 or a portion of the digital artwork, the suggestion module may identify objects in the artwork or the portion of the artwork, and the suggestion module can identify at least one related object having a co-occurrence relationship with the objects in the digital artwork. The suggestion module 110 may send an indication of the at least one related object over the network 104 as a suggestion to enrich the digital artwork 114.

In one or more implementations, the identification module 202 may be implemented to process the input data 118 to detect and identify an object in the digital artwork 114. For example, the identification module 202 may process the input data 118 to generate first object data 208, second object data 210, and extended element data 212. In this example, the first object data 208 may describe a first depicted object identified by the identification module 202 in the digital artwork 114, such as a bicycle, a woman, a scarf, a pair of sunglasses, a pair of earphones, etc. Further, the second object data 210 may describe a second depicted object identified by the identification module 202 in the digital artwork 114, e.g., if the first object data 208 describes the bicycle, then the second object data 210 may describe the woman, the scarf, the pair of sunglasses, the pair of earphones, etc.

The extended element data 212 may describe additional features of the digital artwork 114 and/or objects in the digital artwork. For example, if the extended element data 212 describes the digital artwork 114, then such description can include a theme or a style, a subliminal message, a limitation such as for compliance with a policy, etc. If the extended element data 212 describes an object or objects in the digital artwork, then the data may describe an arrangement of the objects, relationships of the objects such as whether an object is a child of another object, common positions of the objects such as where an object commonly appears within a parent object, a common number of the objects appearing together such as an object often appears as a single object or as multiple objects, orientations of the objects, variations of the objects, etc.

Consider an example in which the first object data 208 describes a first object depicted in digital artwork and the second object data 210 describes a second object depicted in digital artwork 114. In this example, the extended element data 212 can describe a relationship between the first and second objects or a relationship between one of the two objects and another object. For example, the extended element data 212 may include bounding box information to identify object relationships which the suggestion module 110 may use to provide suggestions to enrich digital artwork 114. In one example, the first object may have a bounding box that intersects a bounding box of the second object, and the object with the largest bounding box may be identified as a parent object and the other object may be identified as a child of the parent object. This identification information may be included in the extended element data 212. In this manner, the suggestion module 110 may process the extended element data 212 to suggest additions based on the extended element data 212. In an example in which the first object is identified as a parent object of the second object, the suggestion module 110 may be implemented to suggest additional objects that are commonly child objects of the first object and that also have a co-occurrence relationship with the second object.

In another example in which the extended element data 212 includes information that the first object is a parent object of the second object, the suggestion module 110 may be configured to divide the bounding box of the first object into sections such as quadrants and determine a position of the second object relative to the first object. This position can be determined based on the sections having the greatest percentage of the bounding box of the second object. In this example, the suggestion module 212 may use the position information to suggest additions that commonly appear as child objects of the first object in the same position as the second object. For example, assume the first object is a face and the second object is a baseball cap which appears in the top two quadrants of the bounding box of the face, then the suggestion module 110 can use this information to suggest additions such as a cowboy hat, a sombrero, a colorful hairpiece, etc. It should be appreciated that the described systems and techniques are not limited to suggesting additions to enrich digital artwork 114. As illustrated by this example, the suggestions can also be objects to replace the second object—to enrich the digital artwork 114.

In one or more implementations, the extended element data 212 may describe an arrangement of the first object and the second object. For example, the first object may have a bounding box that is contained within a bounding box of the second object and the first object may be identified as a foreground object and the second object may be identified as a background object. This arrangement information may be included in the extended element data 212. In this example, the suggestion module 110 may be implemented to suggest additional objects that commonly appear as foreground objects in the second object and have a co-occurrence relationship with the first object.

In one example, the extended element data 212 may include information describing a common appearance of the first object or the second object in images such as being commonly depicted in images as singles or as multiples. In this example, the first object may be a sun and the second object may be a cloud, and the extended element data 212 may indicate that the second object is commonly depicted in multiples in a given image and the first object is commonly depicted a single time in a given image. In this manner, the suggestion module 110 may be implemented to process the extended element data 212 to suggest another cloud based on the second object commonly occurring in multiples.

In another example, the extended element data 212 may describe an orientation or a variation of the first object or the second object. For example, the first object may be a person and the second object may be a backpack being worn by the person. The extended element data 212 may include information about an orientation of the person and the backpack. In this example, if the extended element data 212 indicates that straps of the backpack are visible, then the suggestion module 110 may identify the second object as the child of the first object and the suggestion module 110 may suggest objects commonly appearing as child objects with the first object such as sunglasses or a baseball hat. Alternatively, if the extended element data 212 indicates that straps of the backpack are not visible, then the suggestion module 110 may identify the first object as the child of the second object and the module may suggest objects commonly appearing as child objects with the second object such as a water bottle.

In one or more implementations, the extended element data 212 may describe movements of objects or sounds of objects which the suggestion module 110 may use to suggest animations or sounds commonly appearing with an identified object. For example, if the first object is identified as a wheel and the second object is identified as a cloud, then the suggestion module 110 can suggest that the wheel may spin and the cloud may drift. In another example, if the first object is identified as a bird and the second object is identified as a bee, then the suggestion module 110 may suggest that a chirping sound be included with the first object and that a buzzing sound be included with the second object. In this way, the suggestion module 110 can be implemented to animate a static illustration or augment a static reality by suggesting sounds and animations commonly appearing with the objects described by the first object data 208 and the second object data 210.

The relationship module 204 is illustrated as receiving the first object data 208, the second object data 210, and the extended element data 212. The relationship module 204 is also illustrated to include co-occurrence data 214. In one or more implementations, the co-occurrence data 214 may describe common occurrences of objects depicted with other objects in images of an image set. For example, it is generally common for a chair to appear with a table in an image. In another example, it is common for a shirt to appear with a pair of pants in images, baseball bats commonly appear with baseballs in images, etc. The co-occurrence data 214 may describe many different objects identified in the images of the image set and a number of times that additional objects appeared with each object of the many different objects. In this way, the co-occurrence data 214 can also describe a likelihood of a particular object appearing with another particular object in the images of the image set.

Consider an example in which the image set includes 10 images and these 10 images include multiple types of objects and at least some of the objects are a table and a chair. Further assume that the table appears in four of the images and the chair appears in three images, and that the table and chair appear together in three images. In this example, the co-occurrence data 214 may indicate that the number of co-occurrences between the chair and the table is three. In one or more implementations, the co-occurrence data 214 may also describe a relative likelihood of co-occurrence of a particular object given the appearance of another particular object. For example, given the appearance of the table, the chair also appeared in three out of four images; however, given the appearance of the chair, the table appeared three times out of three images. In this example, the co-occurrence data 214 may describe that for the chair and the table, the table is more likely to appear in the images given the chair than the chair is to appear given the table.

Consider another example in which the image set includes the same 10 images as in the previous example, and at least some of the objects appearing in the images are a towel and a beach. Further, assume that the towel and the beach each occur in two of the 10 images and that the towel and the beach only appear together in one image. In this example, the towel and the beach are equally likely to appear given the appearance of the other. The co-occurrence data 214 may describe a likelihood that the chair will appear in an image given the appearance of the table as being higher than the likelihood that the beach will appear in an image given the appearance of the towel because the table and chair appear together in three images and the beach and towel appear together in one image in this example.

In one or more implementations, that relationship module 204 may be implemented to process the first object data 208, the second object data 210, and/or the extended element data 212 to generate third object data 216 based on the co-occurrence data 214. For example, the third object data 216 may describe a third object, and the relationship module 204 may identify the third object from the co-occurrence data 214 as having a co-occurrence relationship with an object described by the first object data 208. In one example, the relationship module 204 can identify the third object from the co-occurrence data 214 as having a co-occurrence relationship with an object described by the second object data 210. In another example, the relationship module 204 may identify the third object as having a co-occurrence relationship with the object described by the first object data 208 and with the object described by the second object data 210. In one or more implementations, the relationship module 204 can identify the third object from the co-occurrence data 214 based on the extended element data 212.

The rendering module 206 is illustrated as receiving the third object data 216 that describes the third object. For example, the rendering module 206 may be implemented to receive the third object data 216 to process the third object data and render an indication of the third object in the user interface 116. In some examples, the rendering module 206 may render the indication of the third object in the user interface 116 as a suggested addition to the digital artwork 114. In other examples, the rendering module 206 may render the indication of the third object as a thumbnail in the user interface 116. In this way, the suggestion module 110 is implemented to identify a first object and a second object from the digital artwork 114 and suggest the third object in the user interface 116 based on the co-occurrence data 214.

In other examples, the co-occurrence data 214 and/or the third objet data 216 can be used in various implementations to provide many functional improvements to computer-related technology. For example, object co-occurrence information may be used to augment image search technology by suggesting stock images that may be of interest to a user based on the co-occurrence data 214. In another example, the third object data 216 may describe an object related to the first object or the second object and the rendering module 206 can be implemented to present an image having the object to inspire a user, e.g., in real time as the user is interacting with the first object or the second object in the user interface 116. Furthermore, these systems and techniques may be used to animate objects, create videos, and provide augmented reality based on the third object data 216 describing a motion graphic, a video sequence, a sound etc.

In some examples, the suggestion module 110 may be used in conjunction with or as an alternative to a machine-learning model. As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. According to various implementations, such a machine-learning model uses supervised learning, semi-supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data.

In one or more implementations, the first object data 208 may describe a first object and the second object data 210 may describe a second object. In this scenario, the first object and the second object may have a style and the suggestion module 110 may identify a third object as having a co-occurrence relationship with the first object or the second object and a machine-learning model can learn the style of the first and second object such that third object data 216 describes the third object and the third object also has the style. In this way, the suggestion module 110 can be implemented to provide assistive drawing functionality, e.g., by suggesting a relevant addition (e.g., based on co-occurrences) having the style of the first and second object (e.g., by leveraging the machine-learning model).

In some examples, the described systems and techniques may be used for style compliance or subliminal messaging. In one example, a company that makes and sells electric cars may choose to have a brand style that includes some green vegetation in all marketing materials. In this example, the suggestion module 110 and/or weights of the co-occurrence data 214 can ensure that the third object data 216 describes an object having green vegetation. Specifically, weights of the co-occurrence data 214 may be adjusted to favor identification of objects having green vegetation. Additionally or alternatively, the weights may be based on machine learning, e.g., the relationship module 204 determines and applies weights to values indicative of a number of co-occurrences.

A machine-learning model can also be used to learn a style or a subliminal message to support such functionality in suggestions generated by the suggestion module 110. In another example, a company that manufactures and sells consumer electronics may choose to have a subliminal message such that every time a person appears in marketing material, the person is either wearing earphones or carrying a phone. In this example, the suggestion module 110 and/or weights of the co-occurrence data 214 can ensure that the third object data 216 describes earphones or a phone whenever the first object or the second object is a person.

In one or more implementations, the suggestion module 110 may be implemented to generate graphics to illustrate potential artwork that may be created based on a user's initial artwork, e.g., in the digital artwork 114. This can include suggestions of variations of the initial artwork such as replacing, adding, or removing objects. In this example, the suggestion module 110 may include a machine-learning model to identify these variations or the variations can be identified using weights of the co-occurrence data 214. Such variations can be identified and presented to the user in real time to enrich the user's initial artwork.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

Figure 3:
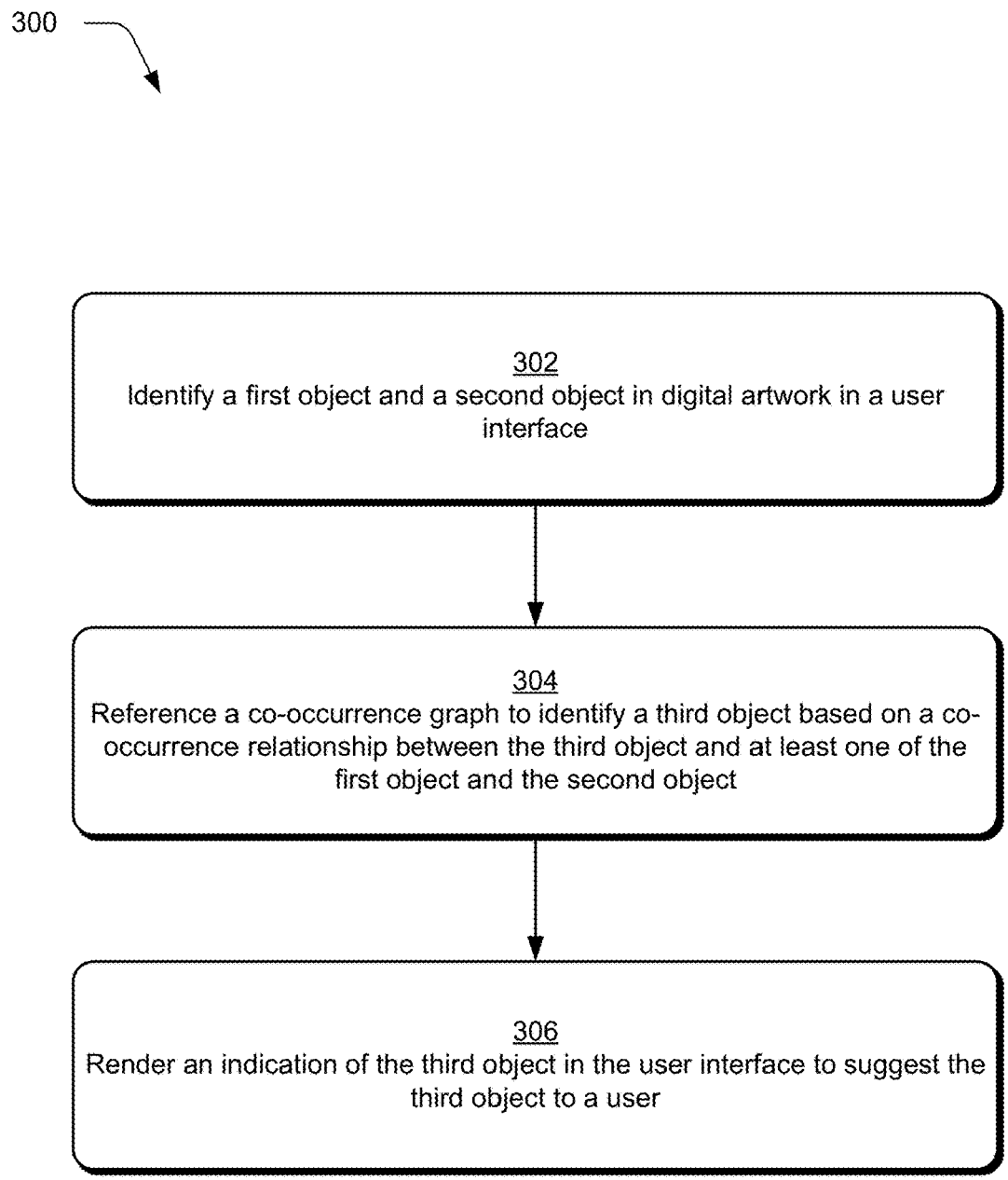
FIG. 3 is a flow diagram depicting a procedure in an example implementation in which a first object and a second object are detected in digital artwork in a user interface and a third object is suggested to a user based on a co-occurrence relationship between the third object and at least one of the first object and the second object.

FIG. 3 is a flow diagram depicting a procedure 300 in an example implementation in which a first object and a second object are detected in digital artwork in a user interface and a third object is suggested to a user based on a co-occurrence relationship between the third object and at least one of the first object and the second object. The first object and the second object are identified in digital artwork in a user interface (block 302). In one or more implementations, the first object data 208 can describe the first object and the second object data 210 may describe the second object. A co-occurrence graph is referenced to identify a third object based on a co-occurrence relationship between the third object and at least one of the first object and the second object (block 304). For example, the co-occurrence data 214 may describe the co-occurrence relationship between the third object and at least one of the first object and the second object. An indication of the third object is rendered in the user interface to suggest the third object to a user (block 306).

Example Representations of Suggestions to Enrich Digital Artwork

Figure 4:
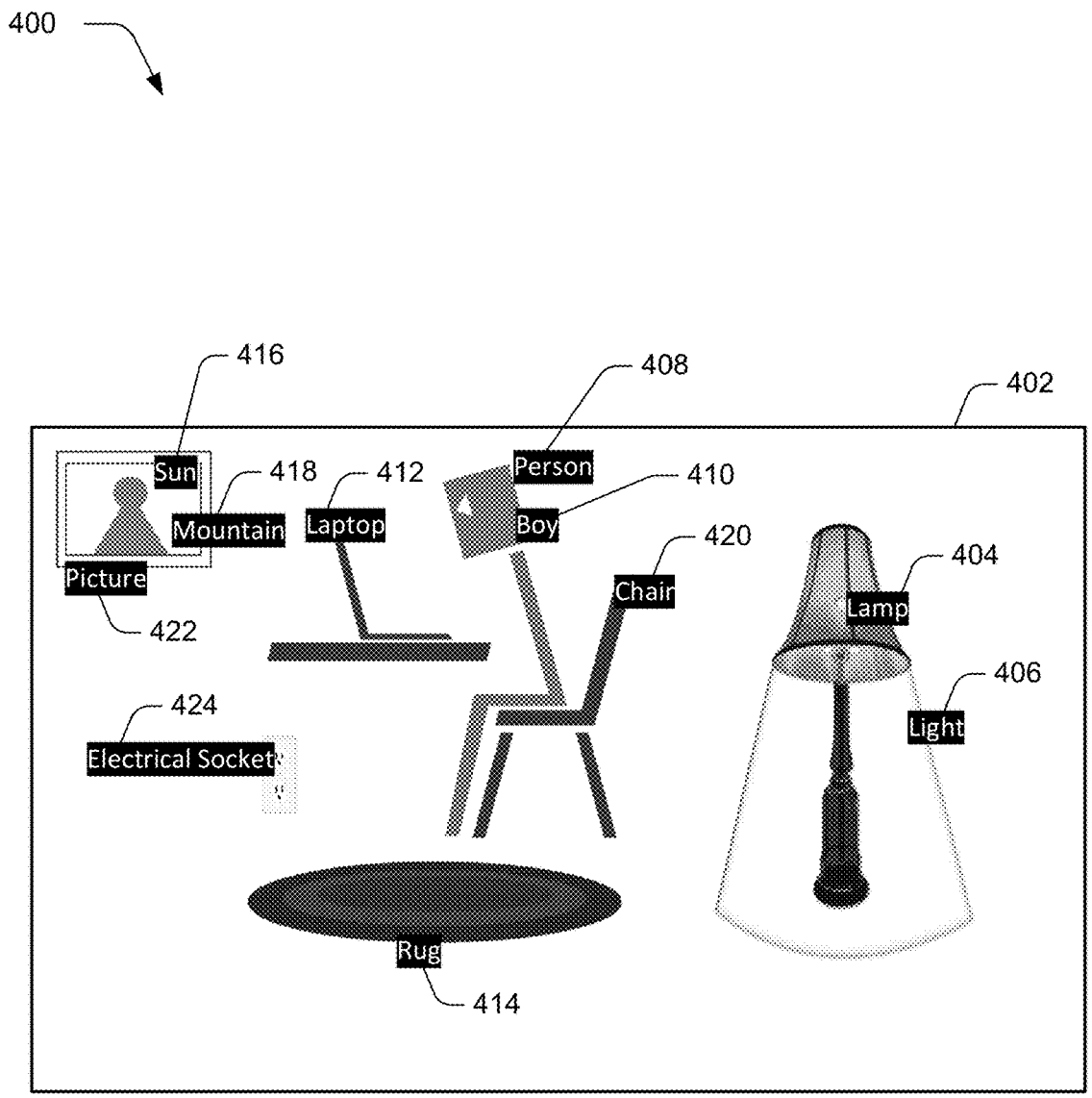
FIG. 4 is an illustration depicting an example representation of object detection and identification in digital artwork.

FIG. 4 is an illustration depicting an example representation 400 of object detection and identification in digital artwork. Representation 400 is illustrated to include digital artwork 402 which may be a digital image or which may be a rendering in the user interface 116. For example, the digital artwork 402 may be photorealistic or non-photorealistic. As shown in FIG. 4, the digital artwork 402 includes objects 404-424. In one example, the objects 404-424 depicted in the digital artwork 402 may be included in the co-occurrence data 214 as appearing together in the digital artwork 402. Consider an example in which the digital artwork 114 includes at least one of the objects 404-424. By way of example, assume that the digital artwork 114 includes a lamp 404 and an electrical socket 424 such that the first object data 208 describes the lamp 404 and the second object data 210 describes the electrical socket 424. The suggestion module 110 may suggest any of the objects 406-422 as the third object to include in the digital artwork as having a co-occurrence relationship with the lamp 404 and the electrical socket 424.

Figure 5:
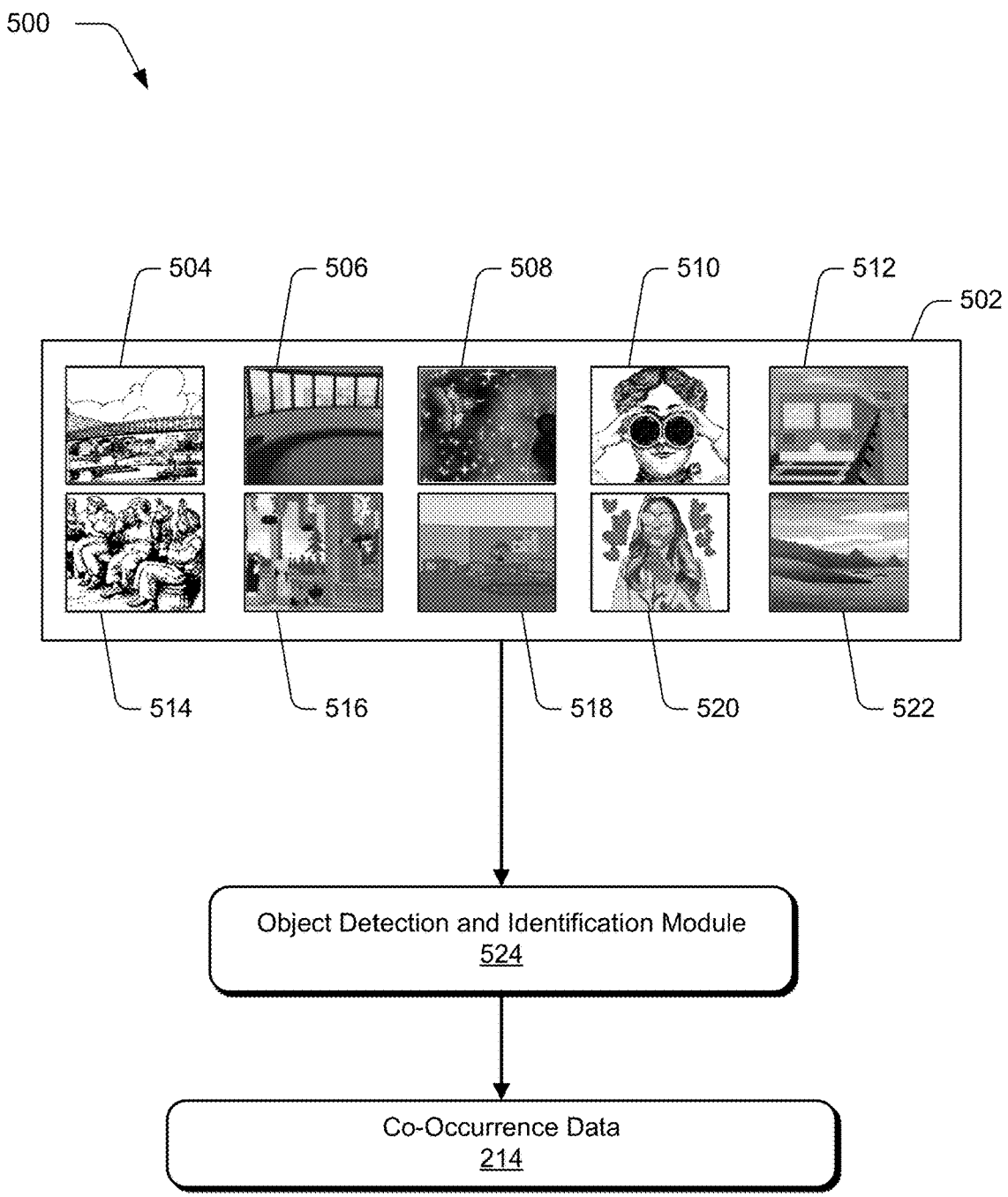
FIG. 5 is an illustration depicting an example representation of generating co-occurrence data from example digital artwork samples.

FIG. 5 is an illustration depicting an example representation 500 of generating co-occurrence data 214 from example digital artwork samples. The representation 500 is illustrated to include an image set 502 which includes images 504-522. In one example, each of the images 504-522 depicts at least two objects. In another example, each of the images 504-522 may include only a single object such as may be used to suggest artwork additions based on extended element data 212. As shown in FIG. 5, the image set 502 is illustrated as being received by an object detection and identification module 524. For example, the image set 502, including images 504-522, may be received by the object detection and identification module 524, and the object detection and identification module may be implemented to detect and identify the objects in images 504-522 which can include vector images and raster images.

In one or more implementations, the object detection and identification module 524 may detect objects in images 504-522 which can be photographs and/or photograph composites, e.g., on an image-by-image basis. Further, as objects are detected and identified, the object detection and identification module 524 may be implemented to modify the co-occurrence data 214 accordingly. For example, the object detection and identification module 524 may include each identified object in the co-occurrence data 214 by adding an indication of each identified object to a co-occurrence graph which is included in the co-occurrence data 214. In this manner, weights of edges of the co-occurrence graph are initially equal before populating the co-occurrence graph with indications of object occurrences in images 504-522. Each time the object detection and identification module 524 identifies two different objects in one of the images 504-522, a weight of an edge between the two identified objects may be incremented to build the co-occurrence graph. In this example, the weight of the edges of the co-occurrence graph represents a relative likelihood of co-occurrence of two objects which are separated by each edge of the graph such that a higher weight indicates a higher likelihood of co-occurrence of the two objects.

In the illustrated representation 500, the object detection and identification module 524 may be implemented to identify: bridge, buildings, cityscape, dog, house, person, road, sky, and tree as objects in image 504; books, chart, lamp, laptop, person, and plant as objects in image 506; light, person, road, sky, and stars as objects in image 508; binoculars and person as objects in image 510; bag, exit, person, road, and train as objects in image 512; chart, laptop, person, and table as objects in image 514; buildings, clouds, house, road, sky, and tree as objects in image 516; books, lamp, plant, sofa, and table as objects in image 518; bag, person, planet, spaceship, and sunglasses as objects in image 520; and bicycle, hills, house, person, sea, sky, stars, and streetlight as objects in image 522.

Figure 6:
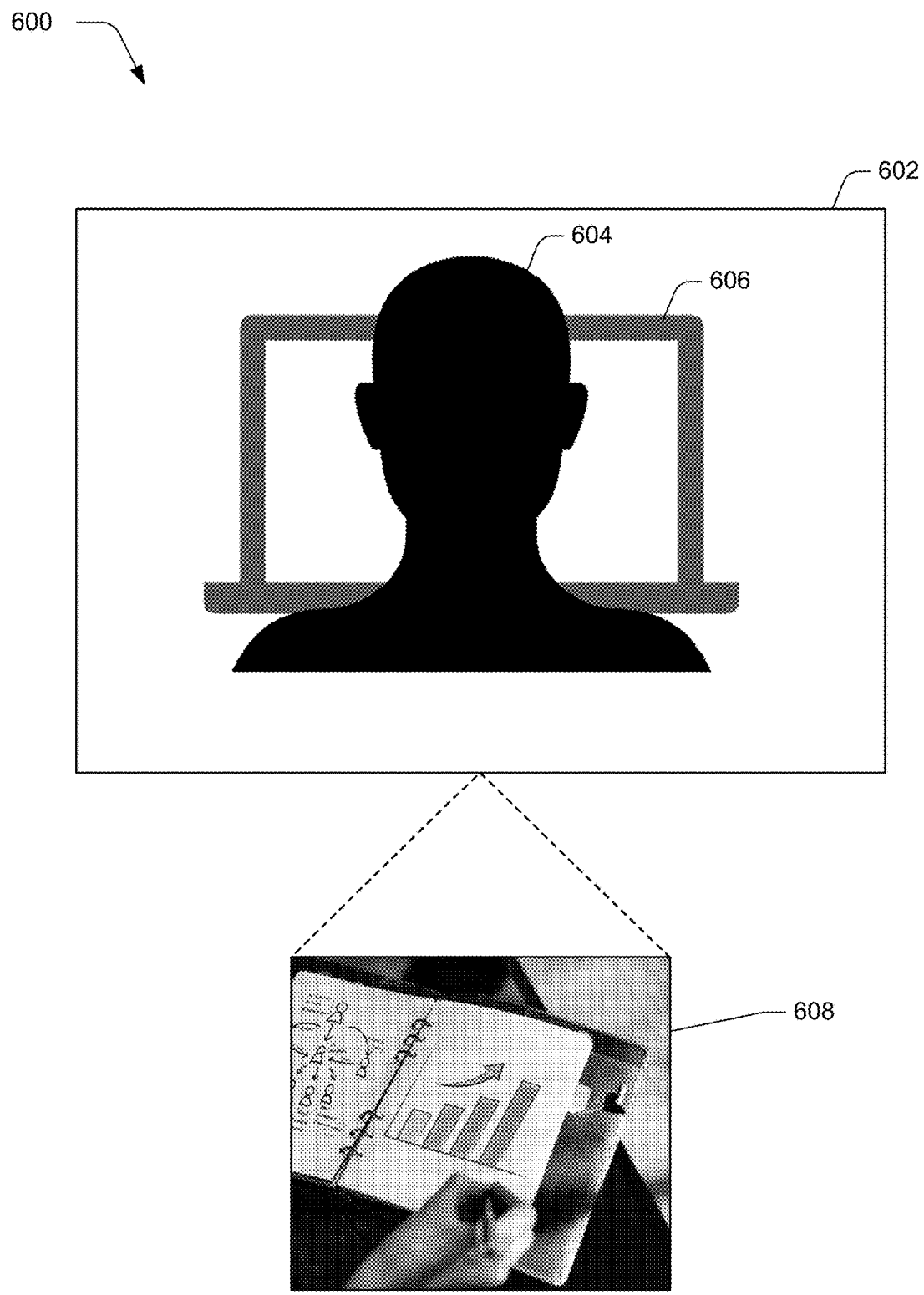
FIG. 6 is an illustration depicting an example representation of a suggestion to enrich digital artwork based on a co-occurrence with objects in the artwork.

FIG. 6 is an illustration depicting an example representation 600 of a suggestion to enrich digital artwork based on a co-occurrence with objects in the artwork. The representation 600 includes digital artwork 602 which is illustrated to include a person 604 and a laptop 606. In one or more implementations, the suggestion module 110 may be implemented to identify the person 604 and the laptop 606 according to the following:

$$S=\{e1,\ldots,en\}$$

where: S is a mathematical set of seed objects; and en is an identified object in the digital artwork 602. The suggestion module 110 may reference the co-occurrence graph (e.g., by referencing the co-occurrence data 214) to determine other objects that are depicted in images with each of the seed objects including a number of times the other objects are depicted in the images with each of the seed objects. Each of these may be a co-occurrence set, and the suggestion module may represent this as:

$$C1,C2,C3,\ldots,Cn$$

where: C1 represents a co-occurrence set for seed element e1 which includes a list of types of objects that are depicted in images also depicting seed element e1 and a number of images that depict each type of object along with seed element e1; and n is equal to a number of seed elements in set S.

In the example representation 600, e1 may correspond to the person 604 and en may correspond to the laptop 606 such that: S={person, laptop}. In this example, the suggestion module 110 may access the co-occurrence graph which is included in the co-occurrence data 214 to identify objects that appear in images 504-522 along with each of the objects in the set S. In one example, the suggestion module 110 may be implemented to include every object identified in the digital artwork 602 in the set S. In another example, the suggestion module 110 may only include some objects or an object identified in the digital artwork 602 in the set S. For example, the suggestion module 110 may be implemented to only include objects identified as being in a focused area of the digital artwork 602 in the set S such as objects in a user-defined area of the artwork or objects in a magnified area of the artwork 602.

In one or more implementations, the objects in the set S may be referred to as seed objects and objects having co-occurrence relationships with the seed objects are included in a co-occurrence set for each seed object as may be determined by the suggestion module 110 from the image set 502. For example, 27 different objects may have a co-occurrence with the person 604 based on the image set 502, and these 27 objects are included in a co-occurrence set for the person 604. Of these, road and sky have a weight of three; bag, chart, house, laptop, and stars have a weight of two; and bicycle, binoculars, books, bridge, buildings, cityscape, dog, exit, hills, lamp, light, planet, plant sea, spaceship, streetlight, sunglasses, table, train, and trees have a weight of one. As previously described, a weight of one can correspond to a single co-occurrence within the image set 502 whereas a weight of three may correspond to three co-occurrences in the images 504-522. In this example, six different objects may have a co-occurrence with the laptop 606 based on the image set 502, and these six objects are included in a co-occurrence set for the laptop 606. Of these, chart and person have a weight of two and books, lamp, plant, and table have a weight of one.

In one or more implementations, the object detection and identification module 524 may be implemented to compute an intersection of the co-occurrence set for the person 604 and the co-occurrence set for the laptop 606 as:

$$I = C1 \cap C2 \cap C3 \cap Cn$$

where: I is the intersection of the sets of objects having a co-occurrence relationship with each of the seed objects. In one example, I may be a set of the most relevant suggestions and any suggestion based on I has at least one co-occurrence with all objects identified in the digital artwork 602. As can be appreciated, I generally decreases as the number of seed objects increases. In some examples, I may include only a few objects or no objects, and in scenarios where I has no objects, suggestions to enrich digital artwork 602 may be derived based on the extended element data 212. In scenarios where n>2, meaning the set S includes more than two seed objects, the suggestion module 110 may be implemented to determine intersections between all co-occurrence sets of possible pairs of seed objects in the set S. This will result in $^nC_2$ pairs of seed objects and the intersections of co-occurrence sets of these pairs may be a set of relevant suggestions. In other words, suggestions based on the intersection of all co-occurrence sets are considered as the most relevant suggestions and suggestions based on intersection of all possible pairs of co-occurrences sets are considered relevant suggestions.

In the example shown in FIG. 6, I can include the following objects: chart, books, lamp, table, and plant. In examples where I includes at least some objects, the suggestion module 110 may be implemented to assign adjusted weights to the objects included in the intersection set I. For example, if weights for a particular co-occurrence object are different for multiple seed objects, then the suggestion module 110 may be configured to assign a highest weight to the objects included in set I. In this manner, the suggestion module 110 may be implemented to assign an adjusted weight of two to chart and an adjusted weight of one to books, lamp, table, and plant. The suggestion module 110 may identify the chart as being the highest weighted object and thus present a chart 608 a suggestion to add to the digital artwork 602.

In one or more implementations, the suggestion module 110 may be configured to present (e.g., render in the user interface 116) an indication of the chart 608 as a selectable addition to the digital artwork 602. This presentation may avoid placing the chart 608 on the digital artwork 602 because a rendering of the chart 608 likely has a different style than the artwork 602, e.g., the artwork 602 may include vector art and the rendering of the chart 608 may include a raster image. For example, the rendering of the chart 608 may include a color that is not complimentary with a color of the digital artwork 602. In this manner, the suggestion module 110 suggests the chart 608 to a user as a relevant object based on the chart's co-occurrence with identified objects in the digital artwork 602, and the user may or may not select the chart 608 for addition to the digital artwork 602 based on the user's artistic discretion.

Consider an example in which the suggestion module 110 suggests an indication of the chart 608 as a selectable addition to the digital artwork 602 based on the chart having a co-occurrence relationship in the image set 502 with an objected identified in the digital artwork 602. In this example, a user may or may not select the chart 608 for addition to the digital artwork 602 based on the indication of the chart presented to the user as a candidate for addition to the digital artwork 602. If the user selects the chart 608 for addition, then the user may add the chart to the digital artwork by drawing the chart within the digital artwork 602, or in another example, the chart 608 may be selectable by the user to add to the digital artwork as an illustrative addition to the digital artwork 602. If the user does not select the chart 608 for addition to the artwork, then the suggestion module 110 may be configured to suggest another object for addition to the digital artwork 602, e.g., by rendering an indication of the other object in the user interface 116. As with the suggested chart 608, the user may or may not select the other object for addition to the digital artwork 602.

Consider another example in which the suggestion module 110 suggests an indication of the chart 608 and also an indication of another object as selectable additions to the digital artwork 602. In this example, a user may select the chart 608 and the other object for addition to the digital artwork by, for example, drawing a chart and the other object in the digital artwork 602. Alternatively, the user may select only the chart 608 or only the other object for addition to the digital artwork 602, or the user may not select the chart or the other object for addition to the digital artwork 602.

An indication of the chart 608 may be presented to a user as text or as an outline in the user interface 116. For example, the suggestion module 110 may present a rendering the indication of the chart 608 in the user interface 116 as a selectable addition to the artwork 602 and the user may select to add the chart to the artwork by including a chart within the digital artwork 602. This inclusion of the chart within the artwork 602 may be accomplished, e.g., by the user drawing the chart within the digital artwork such as through manipulation of an input device. For example, the suggestion module 110 may present the indication of the chart 608 in the user interface 116 in the form of a transitory textual representation, and the user may add the chart 608 to artwork 602 by drawing a chart or by selecting one of a plurality of renderings having a chart as an object. In another example, the suggestion module 110 may present the indication of the chart 608 in the user interface 116 in the form of a user interface component having an indication of a chart property or indications of chart properties which may be selected or adjusted through interaction with an instrumentality of the user interface component to enrich the digital artwork 602.

In an example, the suggestion module 110 may be implemented to present the chart 608 in the user interface 116 as a selectable addition to the digital artwork 602. The suggestion module 110 may adjust an amount of discretion available to a user in accepting the suggested chart 608 for inclusion in the digital artwork 602. In one example, the suggestion module 110 may allow a user to have complete discretion as to whether the chart 608 is included in the digital artwork 602. In another example, the suggestion module 110 may afford a user no discretion as to whether chart 608 is included in the digital artwork 602. An example scenario in which the suggestion module 110 can limit a user's discretion regarding addition of the chart 608 to the digital artwork 602 may include adherence to a brand policy such as a brand policy requiring a chart in all marketing material.

Consider an example in which a user has complete discretion over whether the suggested chart 608 is included in the digital artwork 602, and assume the user decides not to include chart 608 in the digital artwork. In this example, the suggestion module 110 may be implemented to suggest additional objects from the intersection set I to the user.

Since the remaining objects each have an adjusted weight of one, the suggestion module 110 may present each of the remaining objects to the user, e.g., by rendering an indication of each of the remaining objects in the user interface 116. In one example, the suggestion module 110 may determine a relevancy of objects having a same adjusted weight based on considerations such as the feasibility of including the objects having the same adjusted weights in the digital artwork 602. In this example, the suggestion module 110 may determine one of these objects to be a most relevant suggestion based on a specific theme, a brand guideline, a subliminal message, a personalization in an advertising campaign, etc.

Figure 7:
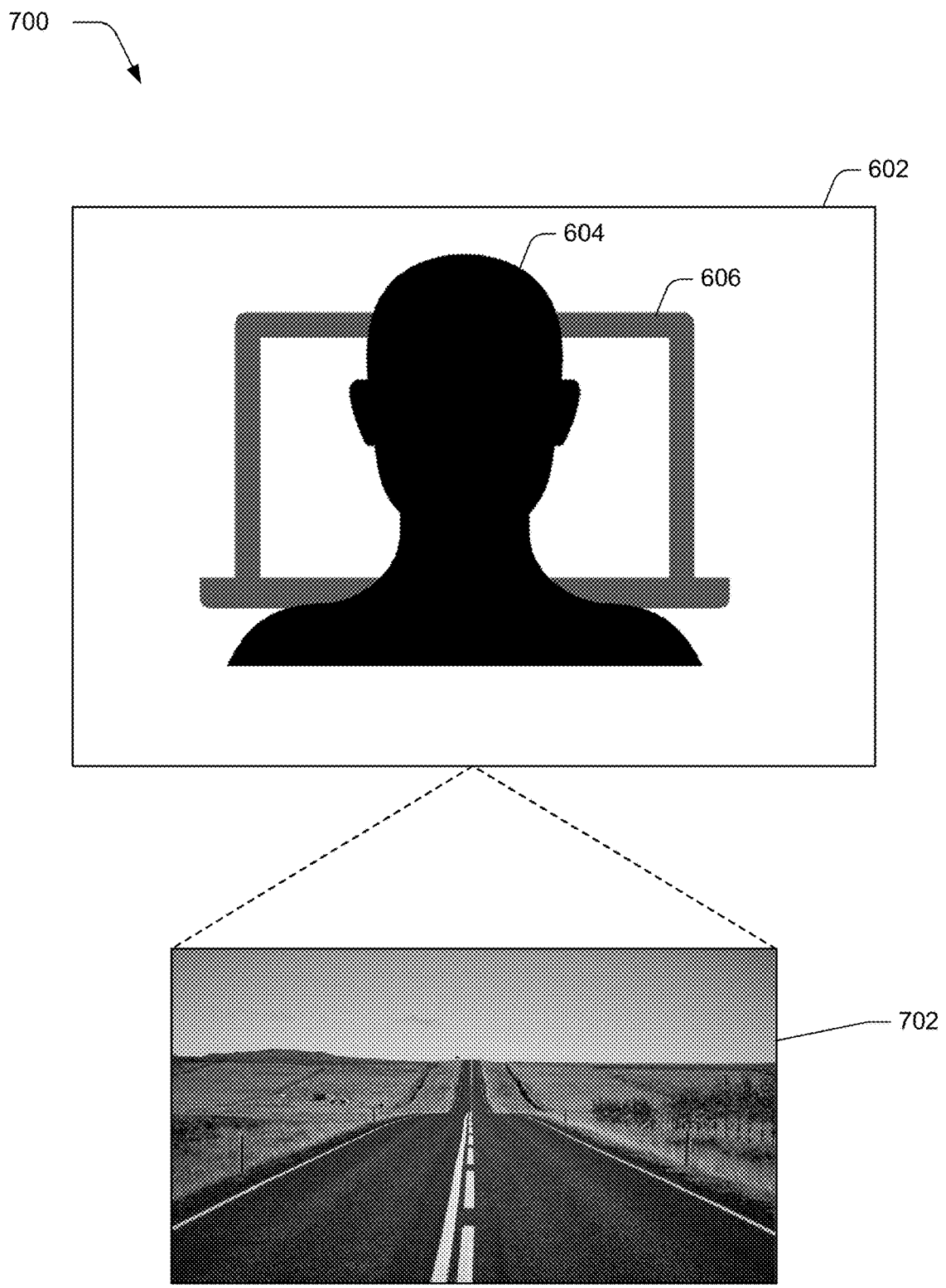
FIG. 7 is an illustration depicting an example representation of a suggestion to enrich digital artwork based the suggestion being greater than a threshold.

FIG. 7 is an illustration depicting an example representation 700 of a suggestion to enrich digital artwork based the suggestion being greater than a threshold. In one or more implementations, the suggestion module 110 may be implemented to suggest objects to enrich digital artwork 602 based on tangential deviations. These tangential deviations are identified based on a union of co-occurrence sets that have each been filtered using a threshold. In general, for three example co-occurrence sets C1, C2, C3, a filtered set may be determined for each of the co-occurrence sets by applying a threshold to the co-occurrence set as:

$$A1, A2, A3$$

where: A1 is a subset of co-occurrence set C1 based on a threshold; A2 is a subset of co-occurrence set C2 based on the threshold; and A3 is a subset of co-occurrence set C3 based on the threshold. The suggestion module 110 may determine the tangential deviations as:

$$T = A1 \cup A2 \cup A3$$

where: T is the tangential deviation set.

Consider an example in which the suggestion module 110 determines objects to suggest for inclusion in the digital artwork 602 based on a number of co-occurrences between the objects and the seed objects to suggest tangential deviations. In this example, the suggestion module 110 may disregard the elements that appear in the intersection set I as well as the seed objects. The suggestion module 110 may determine a threshold for comparison to the co-occurrence weights of the remaining objects. In an example, the threshold can be based on the average weights of objects in a co-occurrence set. The co-occurrence set for the seed object person 604 includes 27 objects and the sum of the weights of these 27 objects is 36, so the threshold in this example is 1.33 for the seed object person 604. The co-occurrence set for the seed object laptop 606 includes six objects and the sum of the weights of these six objects is eight, so the threshold is 1.33 for the seed object laptop 606. Although described as being specific to a co-occurrence set, the threshold may also be determined, e.g., as an average weight of all of the objects combined from co-occurrence sets for every object identified in the digital artwork 602.

In one example, the threshold can be an average weight of the weights of the objects having a co-occurrence with each seed object. In this example, the average weights of objects having a co-occurrence with person 604 is 1.33, and the suggestion module 110 may select the objects having weights higher than 1.33 for adding to the digital artwork 602 which includes road, sky, bag, house, and stars for person 604. Thus, A1 may include road, sky, bag, house, and stars. The average weight of the weights of the objects having a co-occurrence with laptop 606 is also 1.33; however, the suggestion module 110 can determine that no remaining objects have weights above the laptop 606 threshold in this example. For example, A2 may include no objects. The suggestion module may determine the union of A1 and A2 as road, sky, bag, house, and stars. Accordingly, the suggestion module 110 may determine that the following objects may be suggested for inclusion in the digital artwork 602 as tangential deviations: road, sky, bag, house, and stars. As shown in FIG. 7, road 702 is suggested to a user for addition to the digital artwork 602. For example, the suggestion module 110 may render an indication of the road 702 in the user interface 116 to suggest the road 702 as an addition to the digital artwork 602.

It should be appreciated that the threshold may be determined in a variety of ways to enrich the digital artwork 602. Although described as an average of the weights of objects having co-occurrences with objects in the digital artwork 602, the threshold can also be determined so as to include only a maximum or a minimum weight. In an example where the threshold is equal to the maximum weight, the suggestion module 110 can suggest an object that has a high co-occurrence rate with the objects in the digital artwork 602. In an example where there threshold is equal to the minimum weight, the suggestion module 110 may suggest an object that has a low co-occurrence rate with the objects in the digital artwork 602. In some examples, suggestions having a low co-occurrence rate with objects in the digital artwork may be preferable to suggestions have a high co-occurrence rate because the low co-occurrence rate generally correlates to a more creative suggestion whereas a user may have already considered suggestions having the high co-occurrence rate. For similar reasons, the suggestion module 110 may also be implemented to suggest objects having weights below the average weight of the weights of objects having co-occurrences with objects in the digital artwork 602.

Consider additional examples in which the threshold may be determined to filter a co-occurrence set. For example, the threshold may be determined as a weight cutoff such as a number which indicates objects in the co-occurrence set to include in the filtered co-occurrence set. In this example, if the threshold is one, then the suggestion module 110 may select objects in a co-occurrence set with weights greater than one for suggestions to include in the digital artwork 602. Alternatively, the suggestion module 110 may select objects in the co-occurrence set having weights greater than or equal to one as candidate suggestions. In this example, if the threshold is two, then the suggestion module may select objects in the co-occurrence set having weights greater than two or greater than or equal to two for suggestions to include in the digital artwork 602. The suggestion module 110 can also select objects having weights less than two or less than or equal to two for suggestion candidates. In another example, the suggestion module 110 may be implemented to render a user interface component in the user interface 116 having instrumentalities configured to adjust the threshold. For example, a user can interact with the instrumentalities of the user interface component to select a particular weight cutoff and/or whether the weight cutoff is an upper limit or a lower limit, etc.

Figure 8:
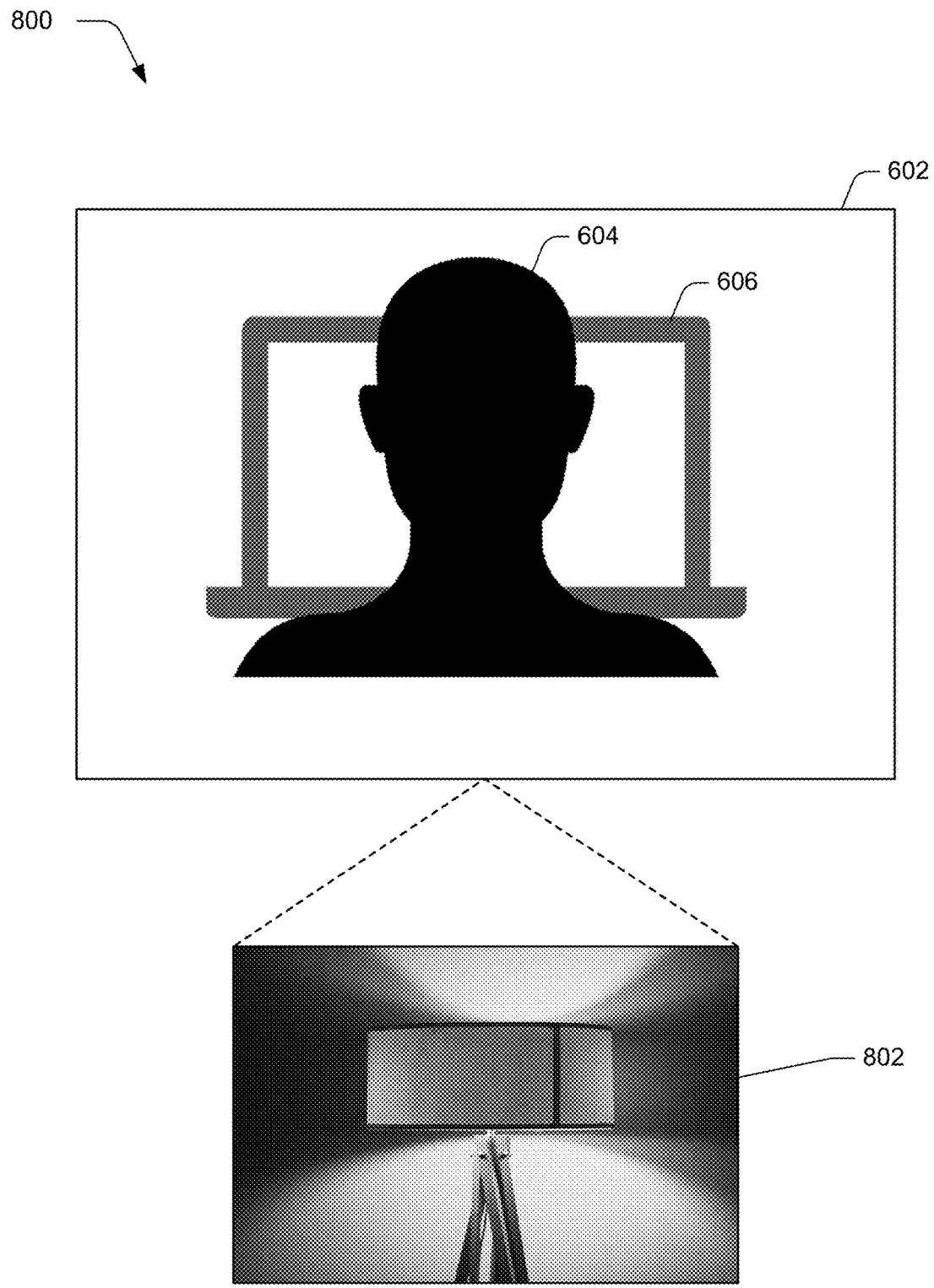
FIG. 8 is an illustration depicting an example representation of a suggestion to enrich artwork based on a co-occurrence with objects in the artwork using different artwork samples to generate co-occurrence data.

FIG. 8 is an illustration depicting an example representation 800 of a suggestion to enrich artwork based on a co-occurrence with objects in the artwork using different artwork samples to generate the co-occurrence graph included in the co-occurrence data 214. Consider an example in which the co-occurrence graph is generated from images other than the images 504-522 of the image set 502. In this example, the suggestion module 110 may be implemented to suggest different additions to the digital artwork 602 based on the different co-occurrence graph included in the co-occurrence data 214.

For example, if image 506 which includes books, chart, lamp, laptop, person, and plant was copied and this copy is used to replace image 514 which includes chart, laptop, person, and table, then a co-occurrence graph generated from the image set 502 would include additional co-occurrences between person 604 and lamp and laptop 606 and lamp. Further, the co-occurrence graph generated in this example would include one less co-occurrence between person 604 and chart and one less co-occurrence between laptop 606 and chart. These differences may cause the suggestion module 110 which suggested the chart 608 for addition to the digital artwork 602 based on the original example co-occurrence graph to suggest a lamp 802 for addition to the digital artwork 602 based on the different co-occurrence graph included in the co-occurrence data 214. As shown in FIG. 8, the suggestion module 110 suggests the lamp 802 for addition to the digital artwork 602 based on the same person 604 and laptop 606 objects but different co-occurrence data 214. In particular, the suggestion module 110 may suggest the lamp 802 by rendering an indication of the lamp 802 in the user interface 116.

Consider an example in which a co-occurrence graph generated using different image sets can provide additional functionality to enrich digital artwork 602. In one example, the co-occurrence graph may be generated using an image set that includes only stock photographs and this co-occurrence graph can be included in the co-occurrence data 214. In this example, the suggestion module 110 can suggest objects to include in the digital artwork 602 based on object co-occurrences in the stock photographs. In another example, the co-occurrence graph may be generated using an image set that only includes examples of digital artwork created by a particular graphic designer. In this other example, the suggestion module 110 may suggest objects to include in the digital artwork 602 based on object co-occurrences in the examples of digital artwork created by the particular graphic designer. In the latter example, the suggestion module 110 may suggest objects to enrich the digital artwork 602 by suggesting objects having a co-occurrence relationship based on the particular graphic designer's previous work whereas in the former example, the suggestion module 110 may suggest objects having a co-occurrence relationship based on the stock photograph examples from many different digital photographers.

Example System and Device

Figure 9:
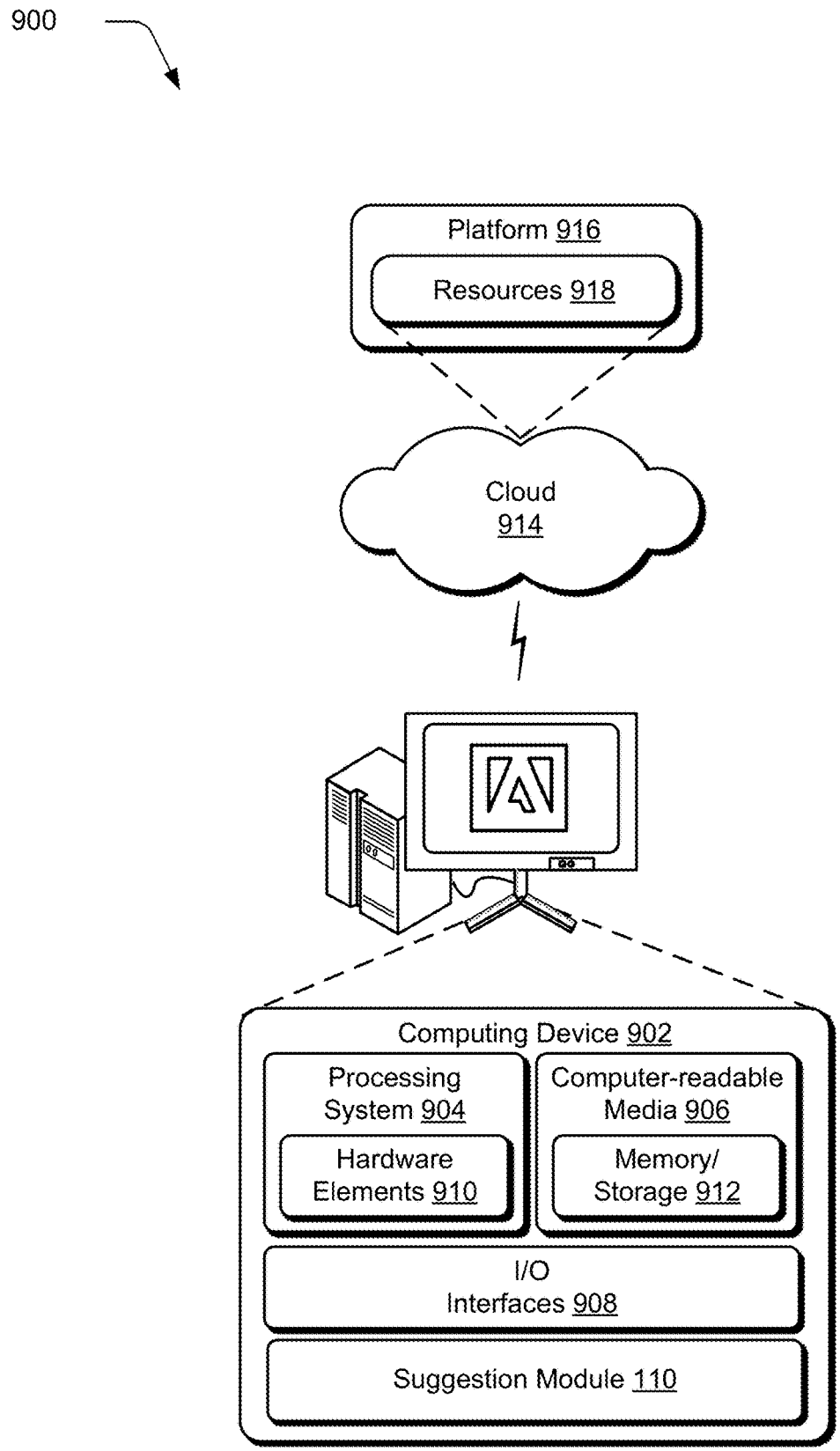
FIG. 9 illustrates an example system that includes an example computing device that is representative of one or more computing systems and/or devices that may implement the various techniques described herein.

FIG. 9 illustrates an example system 900 that includes an example computing device that is representative of one or more computing systems and/or devices that may implement the various techniques described herein. This is illustrated through inclusion of the suggestion module 110. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources 918 and functions to connect the computing device 902 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the implementation suggestions to enrich digital artwork have been described in language specific to structural features and/or methods, it is to be understood that the appended claims are not necessarily limited to the specific features or methods described. Rather, the specific features and methods are disclosed as example implementations of suggestions to enrich digital artwork, and other equivalent features and methods are intended to be within the scope of the appended claims. Further, various different examples are described and it is to be appreciated that each described example can be implemented independently or in connection with one or more other described examples.

What is claimed is:

1. In a digital medium environment to identify a first object and a second object in digital artwork and suggest a third object to a user to enrich the digital artwork, a method implemented by a computing device, the method comprising:

identifying, by the computing device, the first object and the second object in the digital artwork in a user interface;

determining, by the computing device, an object relationship between the first object and the second object based on a bounding box of the first object and a bounding box of the second object;

referencing, by the computing device, a co-occurrence graph to identify the third object based on the object relationship between the first object and the second object and a co-occurrence relationship between the third object and at least one of the first object and the second object; and rendering, by the computing device, an indication of the third object in the user interface to suggest the third object to the user in real time as the user is interacting in the user interface.

2. The method as described in claim 1, wherein the co-occurrence relationship is a weighted number of images of an image set that include both the third object and the at least one of the first object and the second object.

3. The method as described in claim 1, wherein the co-occurrence relationship is based on a number of images of an image set that include both the third object and the at least one of the first object and the second object being greater than a threshold.

4. The method as described in claim 1, wherein the co-occurrence relationship is based on a number of images of an image set that include the first object, the second object, and the third object.

5. The method as described in claim 1, wherein the co-occurrence relationship is based on a relative orientation of the third object and the at least one of the first object and the second object in images of an image set.

6. The method as described in claim 1, wherein the co-occurrence relationship is based on at least one of a specific theme, a brand guideline, a subliminal message, or a personalization in an advertising campaign.

7. The method as described in claim 1, wherein the indication of the third object includes an animation selectable for addition to the digital artwork.

8. The method as described in claim 1, wherein the indication of the third object includes a thumbnail of the third object.

9. The method as described in claim 1, wherein the indication of the third object includes a sound selectable for addition to the digital artwork.

10. The method as described in claim 1, further comprising identifying a fourth object in the digital artwork wherein the co-occurrence relationship is based on the third object being depicted in an image that includes the first object and the fourth object.

11. In a digital medium environment to identify a first object and a second object in digital artwork and suggest a third object to a user to enrich the digital artwork, a system comprising:
    an identification module implemented at least partially in hardware of a computing device to:
        identify the first object and the second object in the digital artwork in a user interface; and
        determine an object relationship between the first object and the second object based on a bounding box of the first object and a bounding box of the second object;
    a relationship module implemented at least partially in the hardware of the computing device to reference a co-occurrence graph to identify the third object based on the object relationship between the first object and the second object and a co-occurrence relationship between the third object and at least one of the first object and the second object; and
    a rendering module implemented at least partially in the hardware of the computing device to render an indication of the third object in the user interface to suggest the third object to the user in real time as the user is interacting in the user interface.

12. The system as described in claim 11, wherein the co-occurrence relationship is a weighted number of images of an image set that include both the third object and the at least one of the first object and the second object.

13. The system as described in claim 11, wherein the co-occurrence relationship is based on a number of images of an image set that include both the third object and the at least one of the first object and the second object being greater than a threshold.

14. The system as described in claim 11, wherein the co-occurrence relationship is based on a number of images of an image set that include the first object, the second object, and the third object.

15. The system as described in claim 11, wherein the indication of the third object includes an animation selectable for addition to the digital artwork.

16. The system as described in claim 11, wherein the indication of the third object includes a thumbnail of the third object.

17. In a digital medium environment to suggest a graphical element to a user, a method implemented by a computing device, the method comprising:
    identifying, by the computing device, a first object and a second object in digital artwork in a user interface;
    determining, by the computing device, an object relationship between the first object and the second object based on a bounding box of the first object and a bounding box of the second object;
    determining, by the computing device, at least one additional object that appears in images of an image set by referencing a co-occurrence graph, the images of the image set including both the first object and the second object, the at least one additional object determined at least partially based on the object relationship between the first object and the second object; and
    generating a suggestion for the user to include in the digital artwork by rendering an indication of the graphical element in the user interface based on a feature of the at least one additional object, the indication rendered in real time as the user is interacting in the user interface.

18. The method as described in claim 17, wherein the indication of the graphical element includes an animation selectable for addition to the digital artwork.

19. The method as described in claim 17, wherein the feature of the at least one additional object is at least one of a specific theme, a brand guideline, a subliminal message, or a personalization in an advertising campaign.

20. The method as described in claim 17, wherein a number of times that the at least one additional object appears in the images of the image set is greater than a threshold.

\* \* \* \* \*